United States Patent Office 2,897,933
Patented Aug. 4, 1959

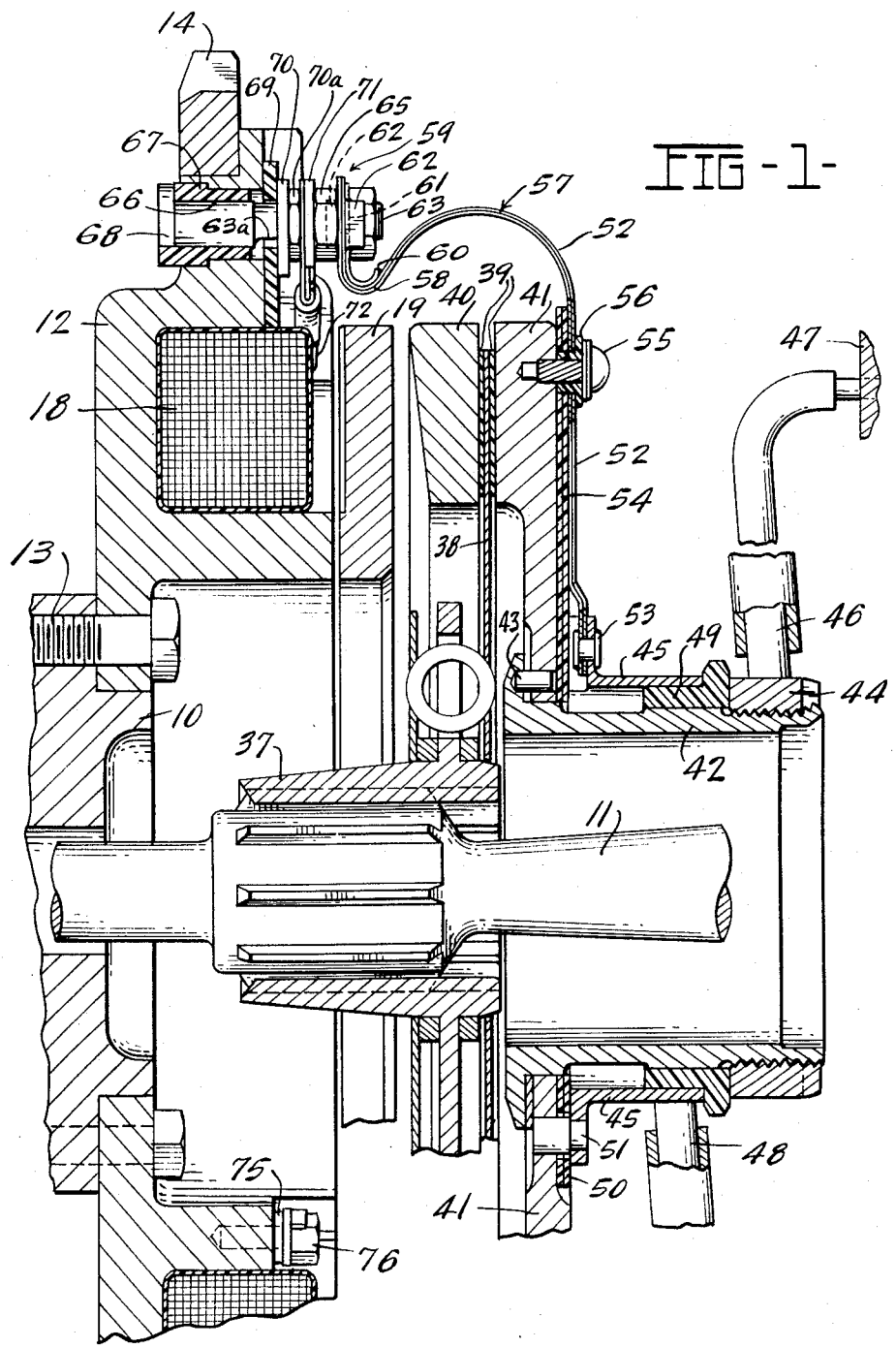

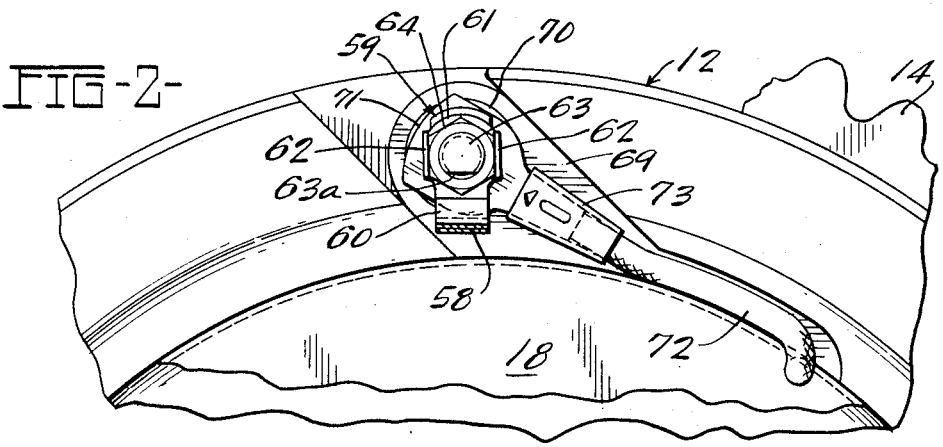
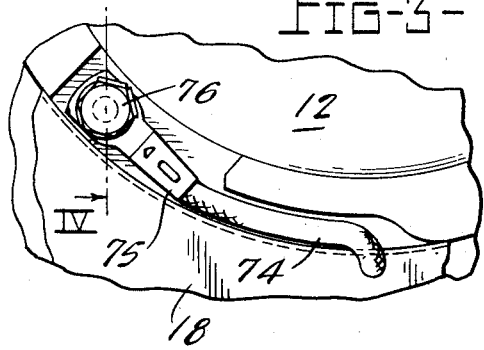
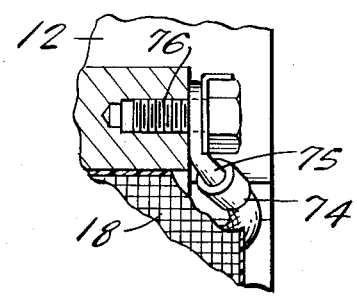
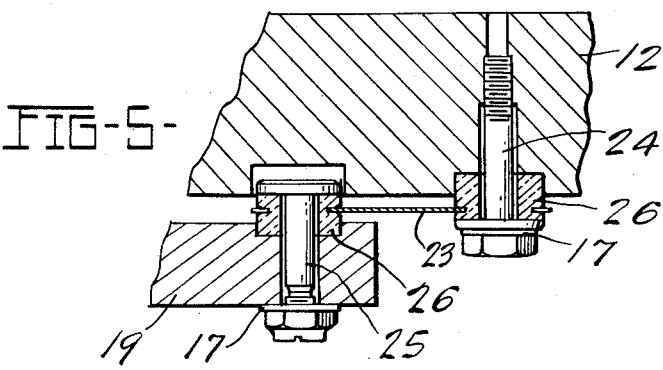

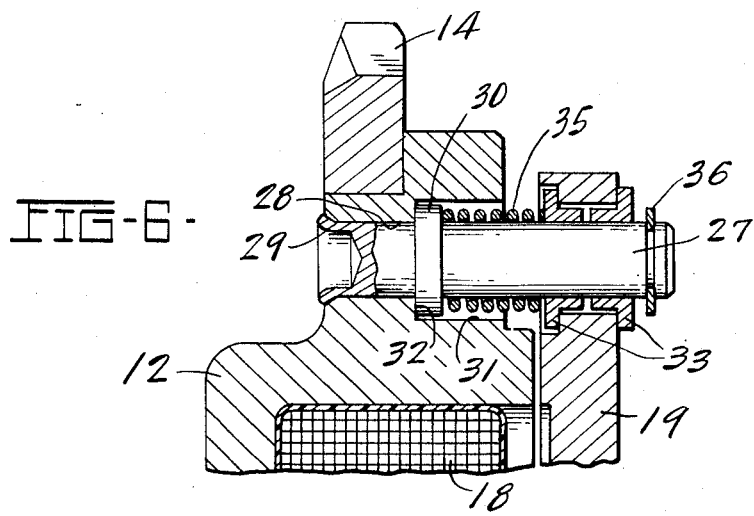
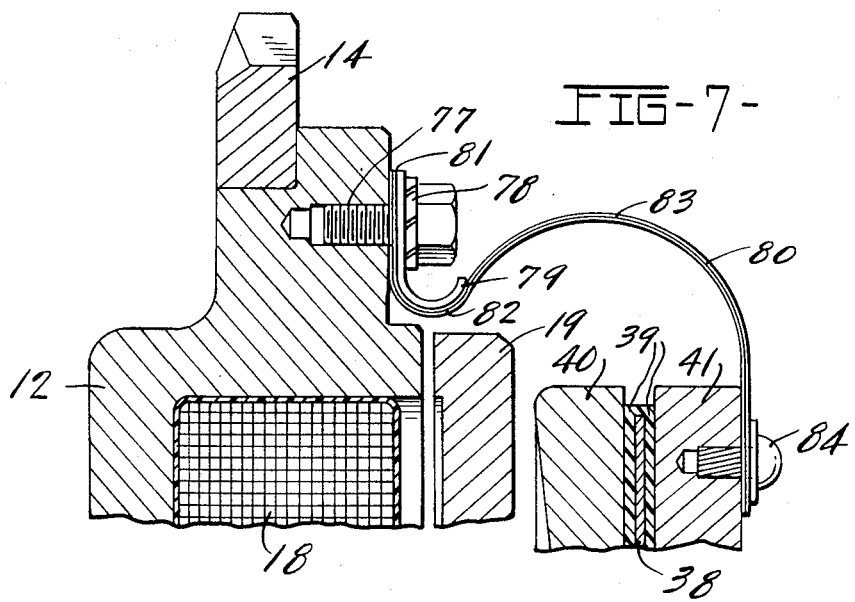

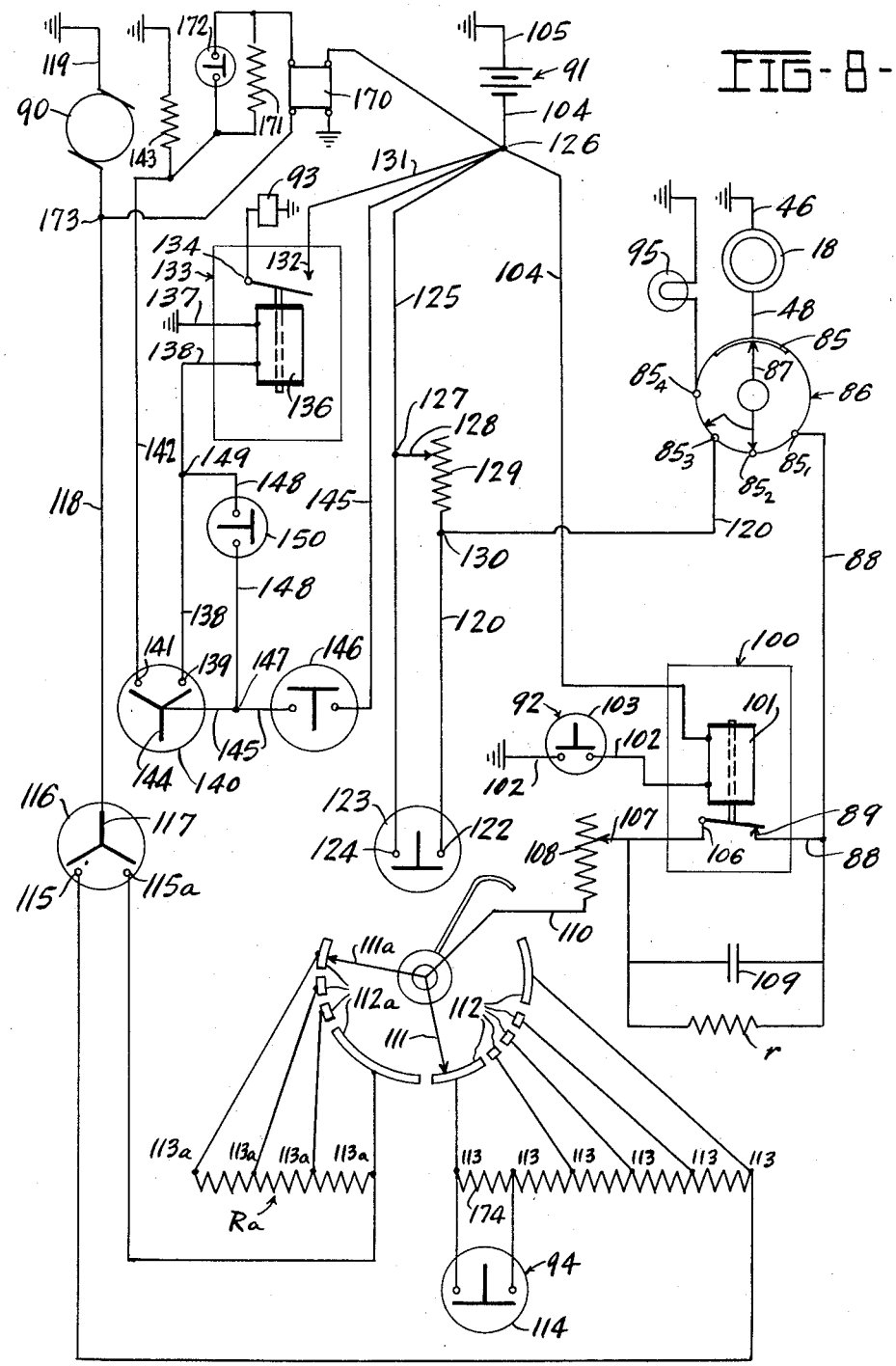

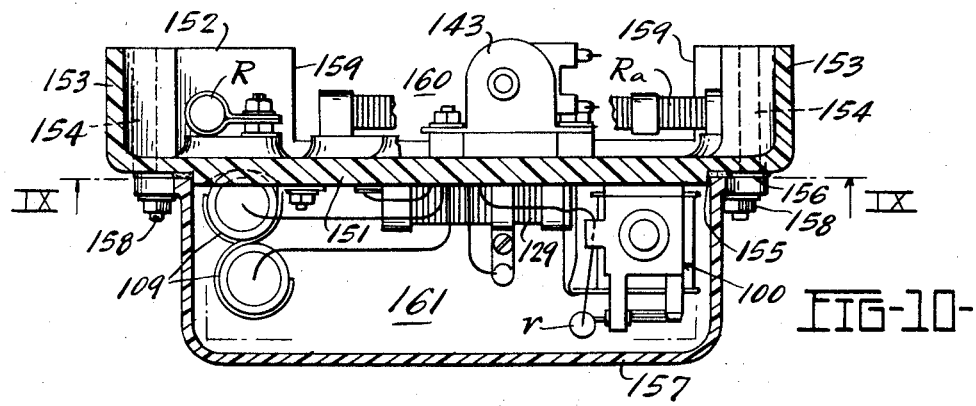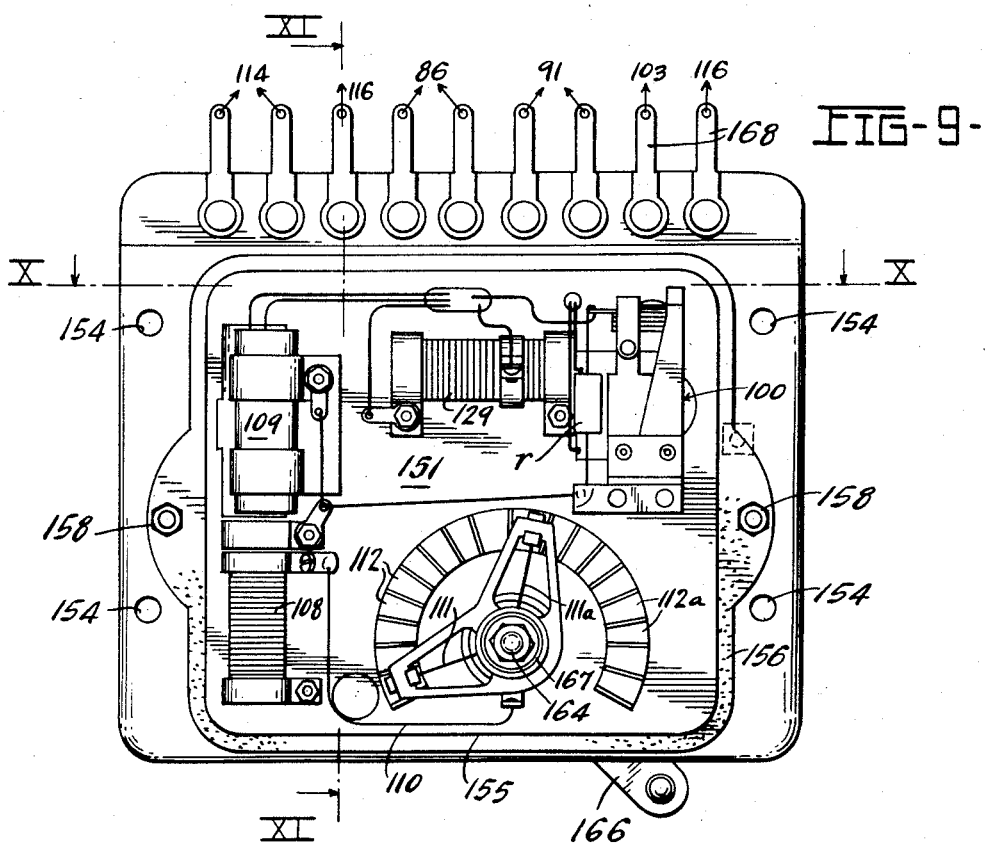

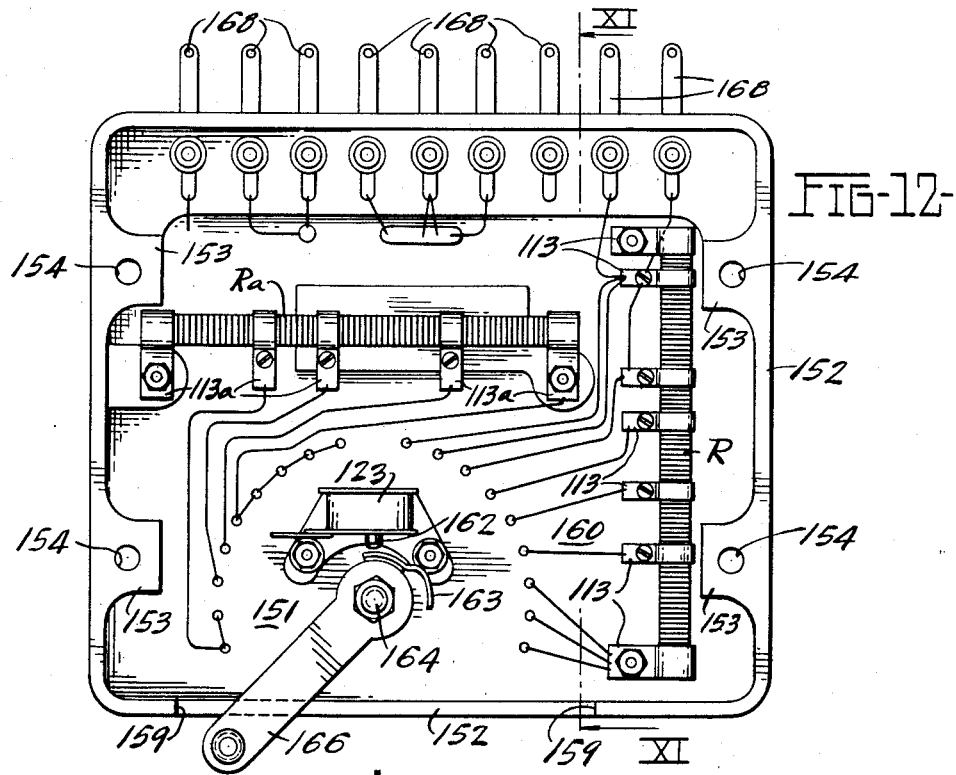
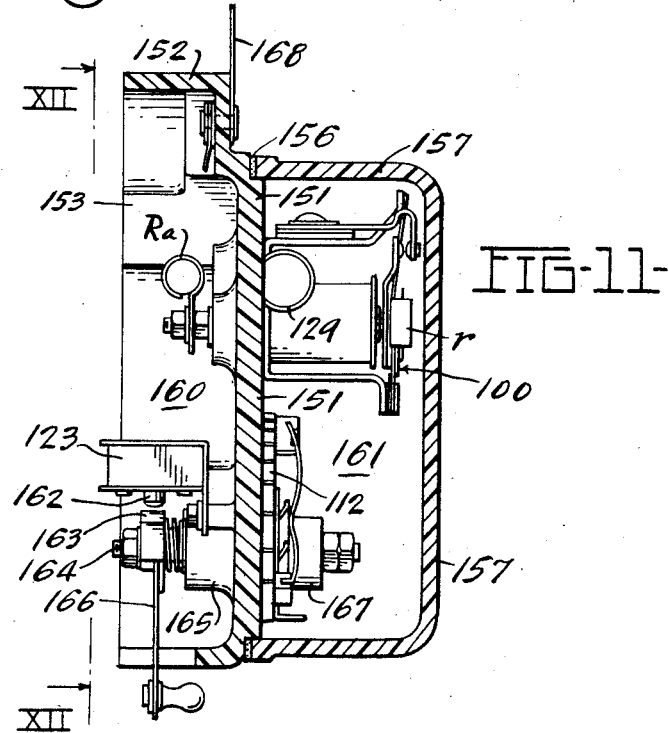

2,897,933

ELECTROMAGNETIC CLUTCH

Jean Maurice, Ablon, and Michel Rist, Paris, France, assignors to Societe Anonyme Francaise Du Ferodo, Paris, France, a corporation of France Application November 16, 1954, Serial No. 469,261

Claims priority, application France November 17, 1953

5 Claims. (Cl. 192—84)

The present invention relates to electro-magnetic clutches, and more particularly to electro-magnetic clutches for automobile vehicles, of the type in which the operating coil of the clutch is supplied from the dynamo through the intermediary of regulating means or from the battery at will, the energisation of the said coil causing friction plates to move close to each other.

One object of the present invention is to enable the dynamo to be excited automatically when the starter is actuated and to prevent a defective performance of the dynamo interfering with the correct supply of current to the said coil.

A further object is to prevent the vehicle being started-up prematurely.

A further object is to improve the appearance of the conductors and electric members of the coil circuit.

Another object is to provide an advantageous arrangement for a casing in which the members of the coil circuit may be housed.

Still a further object is to ensure correct operation of the clutch when a choke device is utilised, and especially an automatic choke device.

Further objects, special features and advantages of the invention will moreover be brought out in the description which follows below of one form of embodiment of the invention, chosen by way of example, with reference to the attached drawings, in which:

Fig. 1 is a partial view in longitudinal cross-section of a clutch in accordance with the invention.

Fig. 2 is a view in transverse elevation of a detail of Fig. 1;

Fig. 3 is a view in transverse elevation of a further detail of Fig. 1;

Fig. 4 is a view in cross-section following the line IV—IV of Fig. 3;

Fig. 5 is a view in cross-section of a part of the mounting of the armature on the yoke;

Fig. 6 is a view similar to a part of Fig. 1, but in longitudinal cross-section and in a different plane;

Fig. 7 is a further view similar to Fig. 1, but in longitudinal cross-section and following another different plane;

Fig. 8 is an electrical diagram of the supply circuit for the operating coil of the clutch;

Fig. 9 is a view in elevation of a casing intended to receive electrical members of this circuit, following the arrows IX—IX of Fig. 10, the lid of the casing being removed;

Fig. 10 is a view of the casing with the lid shown in cross-section following the line X—X of Fig. 9;

Fig. 11 is a view similar to that shown in Fig. 10, but in cross-section, taken along the line XI—XI of Figs. 9 and 12;

Fig. 12 is a view of the casing in elevation, following the line XII—XII of Fig. 11.

In the form of embodiment shown, which relates to an application of the invention to an automobile vehicle, there will be seen in Fig. 1 at 10 the driving shaft and at 11 the driven shaft of the electro-magnetic clutch. The yoke 12 of this clutch is fixed by means of screws 13 around the driving shaft 10 and carries at its periphery a toothed starter ring 14.

The yoke 12 has a generally annular shape which, in axial cross-section, has the shape of a U on its side, forming a torus-shaped cavity in which the coil 18 of the electro-magnet is housed.

The coil 18 is prepared and mounted in a special manner. In accordance with the invention, the coil is separately impregnated, after which it is stuck inside its housing.

The wire forming the coil is coated with two layers of enamel and a lap of glass. The winding thus constituted is covered with a taping of glass ribbon which is then covered with a taping of cotton, paper or other cellulose material.

By virtue of this arrangement, the cellulose external coating is permeable to varnish, which ensures efficient impregnation and an excellent adhesion of the coil inside its housing. The taping of glass fabric, which is very resistant to heat, makes up for the lack of heat resistance of the external cellulose covering, so that the whole winding assembly easily withstands temperatures in excess of 170° C.

The taped coil is then dried for about two hours at a temperature of 100° C. in order to eliminate all moisture and is then separately subjected to impregnation in a suitable varnish. This impregnating varnish, of the phenoplast resin type, is produced by the condensation of formol in the form of a 30% solution, and of cresol, an oil dryer being introduced into the mixture in a proportion by weight comprised between 65 and 90% of the weight of cresol. There is also preferably added a plastifier formed, for example, by a natural resin. The mixture is then dissolved in trichlor-ethylene.

The coil 18 is impregnated with a varnish of this kind by a process of vacuum and pressure, the varnish being sufficiently fluid to penetrate to the centre of the coil. The impregnation is carried out in the cold state for a period of about two hours.

The coil is then drained and dried at about 80° C. for three hours in order to remove the solvent. A second impregnation similar to the first is then effected.

The coil 18 is then subjected to a baking operation at about 110° C. for a period of six to ten hours so as to bring the varnish into a state in which it is no longer sticky but in which it can still be shaped and may be dissolved in trichlorethylene. The coil is thus polymerised in an incomplete manner but sufficiently for it to stand up to transport without damage.

The housing designed to receive the coil is de-greased and the coil 18 is placed in it. The lead-out wires 72 and 74 are fixed, following which there is poured round the coil inside the housing an adhesive varnish similar to the impregnating varnish but being capable of more rapid polymerisation.

The adhesive varnish of the phenoplastic resin type is produced by the condensation of formol in the form of a 30% solution, and of cresol, a drying oil being introduced into the mixture in a proportion by weight comprised between 40 and 60% of the weight of cresol. No solvent or plastifier is added, but the varnish is heated to between 80° C. and 100° C. in order to make it sufficiently fluid.

When the adhesive varnish has been poured round the coil inside its housing, the whole unit is baked in successive stages, for six hours at 115° C., six hours at 125° C., six hours at 135° C. and eight hours at 170° C. The temperature is not carried any higher in order to avoid causing brittleness and cooling is carried out slowly. The adhesive varnish is thus polymerised in a suitable manner, whilst the polymerisation of the impregnating varnish, which was incomplete, is now completed.

The moving armature 19 of the electro-magnet is mounted to face the yoke 12 and is rigidly coupled to the yoke for rotation whilst being free in respect of axial displacements which are limited by any suitable means, for example by a coupling of three tongues 23 (see Fig. 5) made of spring steel. Each tongue 23 extends in an approximately tangential direction between the yoke 12 and the armature 19, and is fixed to the yoke by means of screw-washers 24 and to the armature by screw-nuts 25. The tongue is located outside the magnetic circuit, and, in order to avoid any magnetic leakage, non-magnetic inset double washers 26 are inserted between each plate and respectively the means of fixation to the yoke and to the armature. The washers 26 are sunk inside housings formed in the yoke and in the armature so as to transmit directly the driving forces. The screws 24 and 25 have a smooth portion mounted with a little play in order that they shall take no part in the transmission of the driving force, and they serve especially in keeping the washers 26 in position through the medium of elastic washers 17. The respective arrangement of the screws 24 and 25 is so chosen that the tongues 23 work under tensile stress.

The amplitude of lateral separation of the armature 19 is limited by means of studs 27 (see Fig. 6). Each stud 27 is a tight driving fit in a drilled hole 28 in the yoke 12 and is chased in at the end at 29 against the yoke. The stud 27 is provided at half its length with a projecting flange 30 engaged with a slight amount of play in an enlarged cylindrical portion 31 of the drilled hole 28 and is held in abutment against the shouldered portion 32 of the said enlarged portion 31 by means of the flared portion 29.

Two shouldered non-magnetic rings 33 are engaged on the stud 27 and are fitted with a certain play inside a hole 34 provided in the armature 19, a small restoring spring 35 acting by thrust, being fitted on the stud between the flange 30 and one of the rings 33, whilst a locking washer 36 is housed in the extremity of the stud.

When the coil 18 is de-energised, the springs 35 force the armature 19 into a well-defined position of maximum separation from the yoke. It will be noted that the arrangement of the studs 27, which has just been described, enables not only a strict right-angle setting of the studs to be obtained with respect to the yoke, but also, by virtue of the play provided in the mounting of the rings 33, a possibility of adapting the studs to slight displacements which may be produced between the armature 19 and the yoke 12. The risks of jamming and their eventual possible repercussions on the condition of electrical connections are thus avoided.

There will be seen at 37 in Fig. 1, the hub of the friction disc which is slidably-mounted by means of splines on the driven shaft 11. The hub 37 is elastically-coupled to the friction disc 38, the friction linings of which are shown at 39. The linings 39 are intended to be gripped between two plates 40 and 41 which are mounted at the side of the yoke 12-armature 19 assembly and which have a diameter roughly equal to that of the yoke and the armature. The plate 40 which is next to the armature 19, is rigidly fixed to the yoke 12 by any suitable means (not shown), whilst the other plate 41 is rigidly fixed to the armature 19.

A conducting shouldered ring 42, extending co-axially with the shaft 11 and spaced apart from the said shaft, is mounted on the conducting plate 41 by means of metal studs 43 and is thus connected to the said plate 41. The ring 42 carries two collectors 44 and 45 of friction bronze.

The collector 44, which is intended to provide the current return to earth, co-operates with a brush 46 connected to a suitable earth 47, for example the general earth of the vehicle or the earth of the dynamo circuit. The collector 44 consists of a nut screwed on to the end of the ring 42.

The collector 45, to which is connected the current lead-in circuit, co-operates with a brush 48 supplied from the electrical circuit of the clutch and consists of a shouldered ring mounted round the ring 42 through the intermediary of an insulating socket member 49 which separates it in addition from the collector 44. The collector 45 is positioned with respect to the plate 41 by means of insulating studs 51 and is pressed against an insulating plate 50 by the nut 44, which ensures by this means the fixing of the collector 42 with respect to the plate 41.

A conducting elastic blade 52 consisting preferably of two or more superposed strips has a width which is great compared with its thickness, for example, purely by way of indication but not in any limiting sense, a width of 8 mm. and a thickness of 0.5 mm. The mean line of the blade is located in an axial plane and the width of the blade is at right-angles to this plane. The blade 52 is fixed and electrically connected to the collector 45 by means of a rivet 53, and extends radially along the plate 41 against an extension 54 of the insulating plate 50 which is fixed to the plate 41 by a suitable nail 55, for example of the Parker type, and suitably insulated from the plate by a washer 56. The blade 52 is extended beyond the plate 41 and is curved in a large arc 57, approximately semi-circular and having its diameter parallel to the axis with a concavity directed towards that axis and a large radius of curvature. The blade is then curved back at 58 in the opposite direction with a curvature of small radius so as to terminate in a radial extremity at 59, the parts 57, 58, 59 having approximately the shape of an asymmetrical S lying on its side. Whilst the greater part 57 of the electric blade 52 is free, the small portion 58 is guided and applied against a hook 60 formed at the end of a bracket 61 having two screw-locking wings 62 directed in opposite senses. The hook 60 gives a satisfactory start to the free portion 58 and, during the course of lateral movement, this free portion 58 winds or unwinds itself on the hook, the radius of curvature of which is chosen for preference equal to that which would normally be taken up by the S-blade under the action of its own springiness. The hook 60 tends to limit the deformation of the blade under the action of centrifugal force and contributes in a general way in giving an excellent behaviour to the blade.

The bracket 61 and also the portion 59 which is applied against it are engaged on a screw 63 mounted on the yoke 12, and are locked between a locking-nut 64 and a nut 65 screwed on to the screw 63 and which are themselves locked after tightening, by the wings 62.

The screw 63 is engaged in a hole 66 in the yoke with the interposition of an insulating socket 67 and is prevented from turning by a head 68 provided with flats. Against the yoke 12, on the side opposite to the head 68 are mounted an insulating plate 69 and an elastic locking washer 70. The whole is retained in position by a nut 70a. Against this nut is applied the thimble 71 of an electric conductor 72 (see Figs. 1 and 2). The screw 63 is preferably provided with a flat 63a with which co-operate corresponding flats formed in the thimble 71 and in the extremity 59 of the blade 52. By means of this arrangement, on the one hand the electrical contacts are ensured independently of the fixation of the screw 63 on the yoke 12, and on the other hand, the thimble 71 and the blade 52 have no tendency to turn when the nuts 65 and 64 are tightened.

In these circumstances, the excellent condition of the electrical connections will be appreciated. The thimble 71 is fixed to the conductor 72 by insetting, a flexible sheath 73 protecting the inset portion and serving to insulate it. The conductor 72 forms the supply extremity of the wire of the coil 18, the earth end of which consists of a conductor 74 (see Figs. 3 and 4.) A thimble 75 is inset on the conductor 74 and is fixed to the yoke 12 by screws 76.

A screw 77 (see Fig. 7) is mounted in the yoke 12 and clamps against the latter, through the medium of a washer 78, on the one hand a guiding hook 79, and on the other hand, a conducting elastic blade 80. This blade is similar to the blade 52 and comprises, with a general shape of an asymmetric S on its side, a radial extremity 81 clamped against the yoke 12 by the screw 77, a small curved-back portion 82 guided by the hook 79 and having a small radius of curvature and a large free semi-circular portion 83 curved in the opposite sense, is then applied and fixed against the plate 41 by a nail 84.

When the current supplying the clutch is approximately zero, the armature 19 is not attracted by the yoke 12 and the restoring springs 35 (see Fig. 6) push back the armature 19 against the abutment at 36 which determines the distance apart of the plates 40 and 41 and ensures a free disengagement of the clutch.

When the current supplying the clutch is not zero, it arrives through the brush 48 (see Fig. 1), passes through the collector 45, the blade 52, the screw 63, the nut 65, the thimble 71, the conductor 72 and passes through the coil 18, which exerts a force of attraction on the armature 19 against the action of the spring 35, and grips the friction linings 39, thus ensuring the action of the clutch, then returns to the earth of the circuit of the dynamo 47 through the conductor 74, the thimble 75, the yoke 12, the blade 80, the plate 41 (see Fig. 7), the ring 42 (see Fig. 1), the collector 44, and the brush 46.

It will be appreciated that, during the combined lateral movement, either when engaging or disengaging the clutch, of the armature 19 and the plate 41, the flexible blades 52 and 80 form a positive electrical connection from which any bad contact is excluded, are connected both to the coil 18 and to the collectors 44 and 45 by direct assemblies through screws and rivets without either welds, soldered joints or springs. These screws and rivets may be replaced by a device comprising a small cambered hook formed at the end of each blade 52 or 80 and elastically locked in a small retaining box fixed to the yoke. However this may be, the arrangement in accordance with the invention ensures an impeccable free passage of electric current in this part of the clutch in which, in the forms of construction proposed up to the present time, slipping or uncertain contacts have given rise to parasitic resistances.

It should be noted that the compact S shape of the portions 57 and 83 of the blades 52 and 80 gives a remarkable behavious to the blades, which work in excellent conditions of flexibility and adaptation to the relative displacements between the plate 41 and the yoke 12. The studs have no tendency to give rise to jamming which would prevent free axial displacement of the various members of the clutch, the correct centering of which is ensured by the tongues 23.

The connection to earth 47 of the outgoing lead of the coil 18 permits in addition, an effective and direct closure of the electric circuit to be obtained without the intermediary of a number of joints. It will be appreciated that an arrangement of this kind enables, with a simple and convenient construction, the suppression of all the bad contacts and other drawbacks which would result from passing the earth-return circuit through the shaft 10 and through the intermediary of the bearings of this shaft, in which the oil and the bad contact surfaces prevent a good earth-return being obtained. Thus, it is certain that the coil 18 will always be supplied with current in a perfect manner whatever the strength of this current may be, whether great or small.

Reference will now be made to Fig. 8 in which is illustrated in more detail the current supply circuit of the coil 18. There is shown in Fig. 8 at 90 the dynamo of the vehicle, driven from the crank-shaft of the engine and at 91 the accumulator battery. The dynamo 90 and the battery 91 are those which form the equipment of a normal automobile vehicle and carry out all their usual functions with the ordinary connections, in particular with a make-and-break switch and/or a voltage regulator 170. There will be seen at 92 a gear-changing lever of the so-called broken type which actuates the gear-box of the vehicle, at 93 the starter for driving the ring 14, and at 94 the air-choke mixture control. There will also be recognized in Fig. 8 the coil of the clutch at 18, the conductor 46 of the earth-return circuit and the current supply conductor 48.

The conductor 48 is connected to the common terminal 85 of a double reversing switch 86 having three positions, and which is mounted on the dashboard of the vehicle.

The moving finger 87 of the double reversing switch 86, which is always connected to the common terminal 85, may be placed at will on one of the three contact studs of the double reversing switch, $85_1$, $85_2$, $85_3$. The contact stud $85_1$ is coupled to a circuit supplied from the dynamo 90; the contact stud $85_2$ is insulated and corresponds to the total cut-off of all supply of current to the operating coil 12 of the clutch; the contact stud $85_3$ is connected to a circuit supplied from the battery 91. In addition, there is provided a contact stud $85_4$ arranged so as to be connected to $85_3$ when the finger 87 is placed on the stud $85_3$. The contact stud $85_4$ is connected to earth through the medium of a filament of an indicator lamp 95.

The contact stud $85_1$ of the dynamo circuit is connected through a conductor 88 to one terminal 89 of a relay 100, the energising coil 101 of which has one of its ends connected to earth through a conductor 102 comprising a switch 103 which is operated by the gear-changing lever 92, whilst the other end of the coil 101 is connected by a conductor 104 to the battery 91 which is connected to earth by a conductor 105. The other terminal 106 of the relay 100 is connected by a conductor 107 to a resistance 108 arranged so as to be adjustable in such manner that the force of attraction between the yoke and the armature of the electro-magnetic clutch always remains appropriate, taking account of the state of wear of the friction linings. A condenser 109 and a resistance $r$ are mounted in parallel with the relay 100 in order to avoid any deterioration of the contacts.

The resistance 108 is connected by a conductor 110 to a moving finger of a rheostat having two branches 111 and 111a and directly or indirectly operated as a function of the position of the accelerator control. The two branches 111 and 111a are respectively and simultaneously applied to the contact studs 112 and 112a of two series of fixed contact studs.

The studs 112 of a first series are, in the example shown, five in number and are connected to various points 113 of a resistance R. A suitable extremity 174 of this resistance is shunted by a switch 114 which is actuated as a function of the position of the control knob 94 of the choke.

The contact studs 112a of the second series are, in the example shown, four in number and are connected to various points 113a on a resistance Ra.

The point 113 located at the end of the resistance R, opposite to the points connected to the switch 114 and a point 113a at the extremity of the resistance Ra, are respectively connected to the terminals 115 and 115a of a reversing switch 116. The moving finger 117 of this switch is connected by a conductor 118 to the dynamo 90, which is itself connected to earth through a conductor 119, and is operated in dependence on the position of the gear-box in such manner as to connect the branch 111 through the intermediary of the whole, a part, or none of the resistance R to the dynamo 90, when the gear-box has its first gear or its reverse gear engaged, and to connect the branch 111a through the intermediary of the whole, a part, or none of the resistance Ra to the dynamo 90, when the gear-box is in the position of second gear, third gear and other higher combinations, as the case may be.

The moving finger, the two branches 111, 111a of which move by equal distances, is preferably mounted to rotate, the contact studs 112 and 112a being mounted on an arc of a circle around the said finger. The latter is rotatably driven by a rod system or other means responsive to variations in the position of the accelerator, so that for the lower gears (first gear, reverse) as well as in the case of the higher gears (second, third), the resistance introduced into the circuit of the dynamo is high when the accelerator is not depressed and is progressively reduced to zero as the accelerator is progressively further depressed.

A dynamo circuit of this kind, which is set in operation when the finger 87 of the double reversing switch 86 is placed on the contact stud $85_1$, thus comprises automatic regulating means which permit of a progressive and efficient operation of the clutch.

The other contact stud $85_3$ of the double reversing switch 86, which connects the circuit to the battery, is connected to a conductor 120 coupled to a terminal 122 of a switch 123. The latter is operated in dependence on the position of the accelerator control and is preferably directly operated by the angular movements of the support of the double finger 111, 111a, in such manner as to remain open as long as the position of the accelerator has not reached that for which the engine no-load speed is less than about 1500 r.p.m., and to close beyond the said position. The other terminal 124 of the switch 123 is connected by a conductor 125 to a point 126 on the conductor 104. A point 127 on the conductor 125 is connected by a conductor 128 to a resistance 129 arranged so as to be adjustable in such a way that the force of attraction of the yoke and the armature, taking account of the state of wear of the friction linings, is slightly greater than the force necessary to transmit the torque produced by the compression of the engine. The resistance 129 is connected to a point 130 on the conductor 120. The point 126 on the conductor 102 and 125 is also connected by a conductor 131 to one terminal 132 of a closure relay 133 of the self-starter 93. The other terminal 124 of the relay 133 is connected to earth by a conductor in which is mounted the starter 93.

The coil 136 of the relay 133 of the starter has one of its ends connected to the earth through a conductor 137 whilst the other end of the coil 136 is connected by a conductor 138 to a terminal 139 of a reversing switch 140. The other terminal 141 of the reversing switch 140 is connected by a conductor 142 to a first extremity of the field winding 143 of the dynamo 90, the other extremity of which is connected to earth. The first extremity of the field winding 143 is also connected to one terminal of the make-and-break switch and regulator 170 through a resistance 171 which can be shunted by a switch 172. This switch is operated in dependence on the position of the control knob 94 of the choke so as to complete the action of the switch 114. The controls for the switches 114 and 172 from the choke knob 94 are provided with advantage in twin form but they may be independent. The resistance 171 is calculated, taking account if need be of the resistance 174 controlled by the switch 114, in such a way as to re-produce during slow running accelerated with the choke, an electro-motive force from the dynamo, greater than that developed at normal slow running without choke but still sufficiently low to prevent the vehicle, when cold and with no load, from being driven on the level. It is to be noted that the electro-motive force under accelerated slow running conditions may reach from three to eight times that generated at normal slow running. The resistance 171 may thus be very small, for example of the order of the resistance of the field winding 143 itself. It is not likely to set back in any inadmissible manner the normal speed of switching-in nor to give rise to premature cutting-out of the dynamo.

It will be appreciated that the combination of the arrangements incorporating the resistances 171 and 174 with the switches 172 and 114 has special advantages with the automatic types of choke devices in which the accelerated slow running speed generally exceeds by more than half again the normal slow-running speed. However, if the acceleration impressed on the engine by the choke were less, either the one or the other only of the devices could be used, depending on whether a switching-in speed a little higher than normal can be accepted or a slight discontinuity in the torque transmitted. The three other terminals of the regulator 170 are respectively connected to earth, to the point 126, and to a point 173 on the conductor 118.

The double moving finger 144 of the reversing switch 140 is connected to the point 126 on the conductor 104 by a conductor 145 comprising a switch 146 for the control of the self-starter 93. A point 147 on the conductor 145 comprised between the reversing switch 140 and the switch 146 is connected by a conductor 148 to a point 149 on the conductor 138 comprised between the coil 136 and the terminal 139. The conductor 148 includes a safety switch 150 controlled in dependence on the position of the gear-box in such manner that the switch 150 is open when a gear is engaged and closed when the gear-box is in neutral.

With a view to starting-up under normal conditions of operation which do not require the use of the choke 94, the general ignition contact is closed. The gear lever 92 is in neutral so that the safety switch 150 is closed. The reversing switch 140 has its finger 144 connected to the terminal 141. When the switch 146 of the starter is closed, the battery 91 supplies current to the coil 136 and this connects the terminals 132, 134 of the relay 133 so that the starter 93 is supplied with current from the battery 91. But at the same time, the field winding 143 of the dynamo 90 is supplied with current so that the dynamo is excited without risk in operation, even after a prolonged period of stoppage. The small value of the resistance 171 permits of re-excitation in this way. If it is desired to increase the dynamo excitation, it will suffice to engage a gear and this will apply the full voltage of the battery to the field winding 143 when the contact 146 is operated, whilst in the first case, the voltage applied to the field winding is reduced due to the operation of the self-starter 93.

When the engine of the vehicle has started up, the switch 146 of the starter is allowed to open. The moving finger 87 is then brought on to the contact stud $85_1$ of the double reversing switch 86. The indicator lamp 95 does not light up. The vehicle being stopped with the engine on slow-running speed, the dynamo generates little current whilst the resistance R, which is wholly in circuit with the exception of the portion short-circuited by the switch 114, reduces this current output still further. The clutch is disengaged and the vehicle remains stationary. The first gear is engaged and the accelerator is depressed. The output of the dynamo increases, whilst the branch 111, passing over the contact studs 112 successively cuts out portions of the resistance R. This produces a progressive engagement of the clutch. The operation of the gear lever 92 when engaging the second gear, closes the switch 103 and breaks the circuit. The clutch is instantly disengaged. At the same time, the finger 117 of the reversing switch 116 leaves the contact stud 115 in order to make contact with the stud 115a. Increase in speed is effected progressively by virtue of the interposition of the resistance Ra, which is of lower value than R and is cut-out in stages during the acceleration period. The same thing is true for the engagement of the third gear and for changing-down through the gears.

In normal operation, the clutch provided with the electrical circuit in accordance with the invention, thus enables easy driving of the vehicle with complete safety. In particular, it will be noted that the switch 150 makes it possible to avoid the operation of the starter when a gear has been inadvertently engaged.

When the engine is cold, the choke knob 94 is pulled out. This enables the whole of the resistance R to be inserted during starting, including the section 174 corresponding to the switch 114, as well as the resistance 171 corresponding to the switch 172. The slow-running speed is thus accelerated, but, in accordance with the invention, the resistances 171 and 174 are so chosen that the vehicle, which is then cold, is not driven. It will be observed that after a pre-determined travel of the accelerator, the supplementary resistance 174 is cut-out. This enables the user to run for as long as may be necessary with the choke in operation without giving rise to premature slip. Only the speed at which the dynamo is switched-in is slightly increased.

When the vehicle is stopped and it is desired to leave it parked with a degree of safety replacing or increasing that obtained from the hand-brake, the finger 87 is placed on the contact stud 85₃. As the accelerator is not depressed, the switch 123 is open. The coil 18 is thus supplied from the battery 91 with a current controlled and reduced by the reistance 129. The indicator lamp 95 lights up feebly. The vehicle is then braked in its position by the engine itself.

In case of break-down of the dynamo, or if it is desired to start-up the engine by driving it from the vehicle, the finger 87 is also placed on the contact stud 85₃. When the accelerator has been sufficiently depressed, the switch 123 short-circuits the resistance 129. After a period of slip, the clutch thus becomes progressively full engaged. The user is warned of this condition by the increased brilliance of the indicator lamp 95.

When the engine has broken down and it is absolutely necessary to move the vehicle forwards or backwards for a short distance, for example if the vehicle is in difficulties at a level crossing, the lever 92 is moved to engage the first gear or reverse which opens the switch 150. The moving contact 87 is then placed on the contact stud 85₃, and the accelerator is depressed to the limit. The coil 18 is then fully supplied from the battery 91 and this keeps the clutch in full engagement. The moving contact 144 is then placed on the terminal 139 so as to short-circuit the open switch 150. It will be noted that, in this case, no current is supplied to the field winding. As soon as the switch 146 of the starter has been closed and held closed, the coil 136 is excited and the starter 93 is supplied with current from the battery 91 and this drives the vehicle forwards or backwards, as the case may be. All danger is then removed.

The relay 100, the condenser 109, the resistance $r$, the resistance 108, the switch 123, the rheostat 112, 112, the resistances R and R$a$, the resistance 129 and eventually the relay 133, are assembled together and housed in a casing mounted under the bonnet of the vehicle. An example of construction of this casing is shown in Figs. 9 to 12, to which reference will now be made.

It will be seen from these figures that the casing or control box comprises a rectangular plate 151 provided with a peripheral edge 152, the assembly 151, 152 being preferably made of insulating plastic material and having the shape of an open box. It will be noted from Fig. 10 that the edge 152 has a wide notch at 159. The edge 152 is provided with four internal bosses 153 pierced with holes at 154 for the application of means for fixing the control box to the chassis. The face of the plate 151 opposite to the edge has a rectangular rebate 155 around which are disposed a joint 156 and a deep cover 157. The latter is detachably mounted in position on the plate 151 by means of two screw nuts 158.

The box thus constructed has two separate spaces or compartments: a space 160, ventilated at 159 but not readily accessible and closed in by the edge 152; and an air-tight and readily accessible compartment 161 comprised within the interior of the cover 157, the two spaces 160 and 161 being adjacent and separated only by the plate 151.

In the ventilated and not very accessible space 160 are mounted the robust electrical components, which are regulated once and for all, or which have a tendency to heat-up.

On the other hand, in the air-tight and accessible space 161 are mounted the delicate electrical components which require to be protected against dust and moisture, and which require periodic adjustment.

There will be recognized in the space 160 the two resistances R and R$a$ which are robust and not especially delicate and which develop heat during their operation; they are provided with collars 113 and 113$a$ which are suitably set in position once and for all. In the space 160 will also be seen the switch 123, and at 162 a push-button for operating this switch. With the push-button 162 is associated a blade 163 having a boss to form a cam and fixed to a shaft 164 rotatably mounted in a self-lubricating bearing provided in a boss 165 on the plate 151. A lever 166 is rigidly fixed to the shaft 164 and passes through the slot 159 in the edge 152. This lever is controlled by a system of rods (not shown) in dependence on the position of the accelerator control. The double finger 111 and 111$a$ is supported by the shaft 164 on the side of the space 161. To this end, an insulating sleeve 167 is provided on the shaft 164 and carries a collector washer connected to the branches 111 and 111$a$. This washer is elastically pressed against a further washer anchored to the plate 151 and connected to the conductor 110.

The contacts sliding on the contact studs 112 and 112$a$ and the contact studs themselves are thus arranged inside the air-tight space 161. There will also be recognized in this space 161, the relay 100, the condenser 109, the resistance $r$ and the wear-compensating and parking resistances 108 and 129. The interior wiring of the control box terminates in terminals 168 to which are connected the cables coupled to the choke switch 114, the reversing switch 116 of the gear-box, the double reversing switch 86, the battery 91 and the switch 103 of the gear lever.

The convenient and compact construction of the control box thus constituted will be appreciated, as will also the efficient protection which it gives to the electrical components. In particular, the condenser and the double rheostat are protected against humidity and dust, the wear-compensating and parking resistances 108 and 129 helping to drive out moisture from the air-tight space 161. On the other hand, the heat which is developed in the resistances R and R$a$, and which would be excessive, is dissipated by means of the opening 159. The dimensions of these resistances R and R$a$ may thus be reduced, which is an advantage from the point of view of production cost, without any risk of inadmissible increases in temperature.

It will also be noted that the control of the rheostat and of the switch 123 is very simple and has practically no risk of failure. In addition, there may be easily added to the shaft 164 any other control which it may be desired to make dependent on the position of the accelerator. The control box also has the advantage of being adaptable to any direction of operation of the accelerator control by a simple modification of the wiring.

What we claim is:

1. An electromagnetic clutch comprising a driving shaft, an electromagnet member secured to said driving shaft, an armature member disposed facing said electromagnet member, means for mechanically connecting said armature member rigid in rotation with said electromagnet member and axially movable with respect thereof, a coil in said electromagnet member for axially attracting when energized said armature member towards said electromagnet member, an inner plate secured to said electromagnet member, an outer plate secured to said armature member, said plates being axially spaced apart from said electromagnet members, a driven shaft, a friction disc rigid in rotation with said driven shaft and grasped between said plates when said coil is energized and said armature member is thereby attracted towards said electromagnet member, a collector ring secured to said outer plate, a stationary electrical brush applied against said collector ring, and a conductive element for electrically connecting said coil with said collector ring, said element comprising an elastic blade extending externally of said plates and armature member and having an arcuate section in an axial plane and spaced from said plates.

2. An electromagnetic clutch according to claim 1, in which said arcuate section comprises a substantially semicircular portion disposed substantially parallel to the clutch axis.

3. An electromagnetic clutch according to claim 2, in which said section comprises two substantially semi-circular portions and is S-shaped.

4. An electromagnetic clutch according to claim 3, in which the portion near the coil is substantially smaller than the portion near the collector ring.

5. An electromagnetic clutch according to claim 1, further comprising a second collector ring secured to said outer plate, a stationary ground brush applied against said second collector ring, and a second conductive element electrically connecting said coil with said second collector ring, said two conductive elements being connected to the two ends of said coil respectively, and said second element having a second elastic blade constructed similarly to the first mentioned blade.

References Cited in the file of this patent

UNITED STATES PATENTS

| | | |
|---|---|---|
| 1,946,200 | Ester | Feb. 6, 1934 |
| 2,297,605 | Camilli | Sept. 29, 1942 |
| 2,319,084 | Workman | May 11, 1943 |
| 2,320,922 | Ford | June 1, 1943 |
| 2,403,340 | Camilli | July 2, 1946 |
| 2,535,366 | Mead | Dec. 26, 1950 |
| 2,688,388 | Gill | Sept. 7, 1954 |